(No Model.)
J. M. STUKES.
CHURN.
No. 553,272.    Patented Jan. 21, 1896.
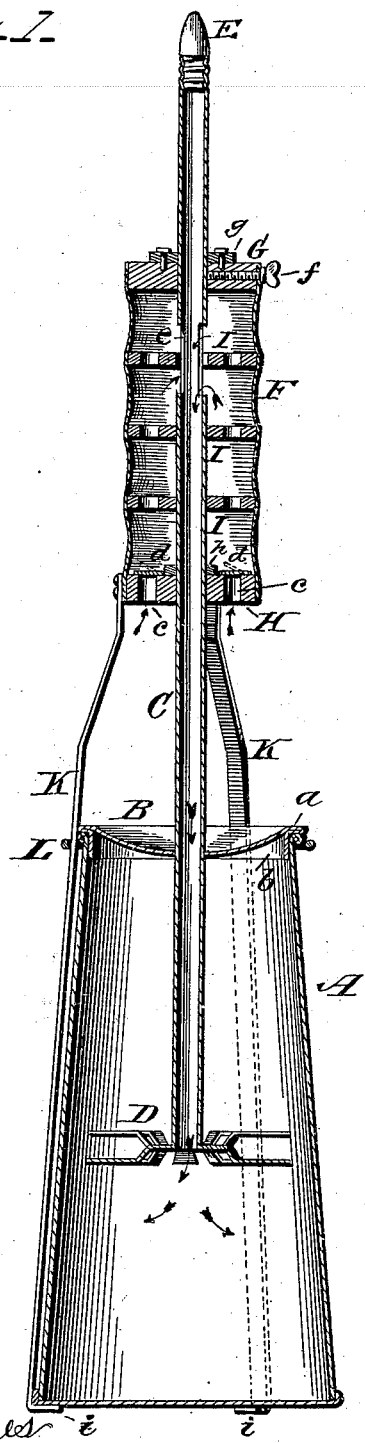
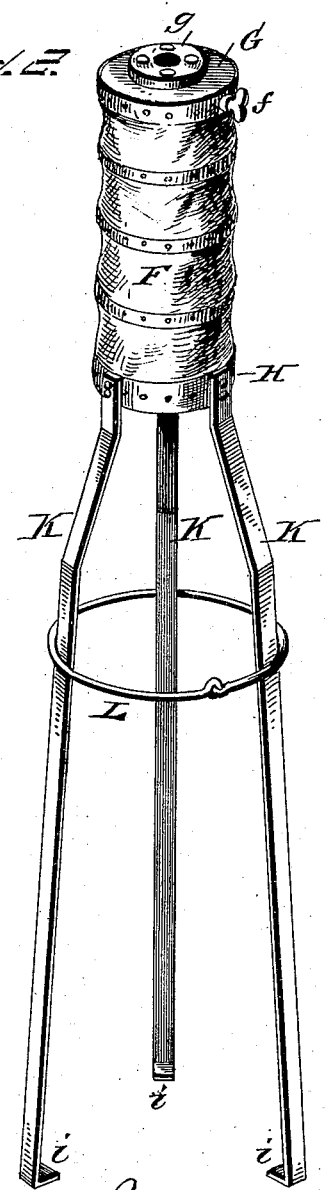
Witnesses
C. J. Williamson
G. Bennett
Inventor
John Marion Stukes.
per Chas. H. Fowler
Attorney.

UNITED STATES PATENT OFFICE.

JOHN MARION STUKES, OF ROSWELL, TERRITORY OF NEW MEXICO.

CHURN.

SPECIFICATION forming part of Letters Patent No. 553,272, dated January 21, 1896.

Application filed May 25, 1895. Serial No. 550,600. (No model.)

*To all whom it may concern:*

Be it known that I, JOHN MARION STUKES, a citizen of the United States, residing at Roswell, in the county of Chaves and Territory of New Mexico, have invented certain new and useful Improvements in Atmospheric Churns; and I do hereby declare that the following is a full, clear, and exact description of the same, reference being had to the annexed drawings, making a part of this specification, and to the letters of reference marked thereon.

The present invention has relation to atmospheric churns, and has for its object to improve the construction thereof whereby the operation of churning will be materially improved, the air being perfectly and thoroughly forced through the cream and mixed therewith and thus bring the oxygen of the air in contact with the sugar in the cream to produce the desired result in separating the butter or oily globules from the other portions of the cream.

The invention consists in a churn constructed substantially as shown in the drawings, and hereinafter described and claimed.

Figure 1 of the drawings is a sectional elevation of a churn constructed in accordance with my invention; Fig. 2, a perspective detail view of the bellows and the clamping-arms which are connected thereto.

In the accompanying drawings, A represents the churn cylinder or body, which may be of any suitable construction, and is provided with a concave cover B having a circumferential flange *a* and downwardly-extending rim *b* to tightly fit within the top of the body A. A dasher-shaft C loosely passes through a hole in the cover B and has upon its lower end a suitable dasher D, which may be of any preferred construction.

The dasher-shaft is formed hollow or tubular to conduct the air down through the same and out at its lower end into the churn-body A, the air agitating and breaking up the butter-globules in the cream and the rapid separation of the butter therefrom.

The upper end of the tubular dasher-shaft C is screw-threaded to receive a screw-threaded plug E, thus closing the opening at the upper end of the shaft and preventing the escape of the air.

When it is desired to clean out the tubular shaft C the screw-plug E is removed and hot water can be poured through the shaft, which will thoroughly clean it.

The dasher-shaft C is detachably connected to a bellows, which bellows consists of the usual leather or other flexible covering F and the heads G H, to which said covering is secured, the head H having the usual valve-openings *c* and valves *d* to receive the air into the bellows at every upward stroke of the dasher-shaft C, the air on the downward stroke of the shaft being forced into said shaft through the openings *c* and down through the lower end of the same into the cream in the churn-body A.

At every upward stroke of the dasher-shaft the valves in the bellows will be closed by the pressure of the atmosphere thereon, the air thus passing into the bellows, and upon the downward stroke of the dasher-shaft the valves will open and the air forced into and through the shaft.

The tubular dasher-shaft C is connected to the bellows by means of a set-screw *f*, or any other suitable and well-known means may be employed so long as it will hold the shaft to the bellows and admit of its being removed therefrom when found necessary. When a set-screw is used it extends through the head G of the bellows, the end of the screw bearing against the dasher-shaft, which will hold said shaft perfectly rigid to the bellows-head.

To provide an air-tight joint between the heads G H and the shaft C, bushings *g h* are secured to the heads respectively, as shown in Fig. 1 of the drawings, which will prevent the escape of air from the bellows other than through the tubular dasher-shaft.

Should it be desired at any time to use the dasher and shaft without operating the bellows, all that is necessary is to disconnect the shaft from the bellows, the two bellows-heads forming guides to the shaft in its reciprocating motion. This bellows is particularly adapted to a churn-dasher, it being different to the bellows heretofore in use in that it has a plurality of partitions I, which act as braces to the flexible covering F. To force the air with the required power to inject the same through the cream for the purpose of agitating it for the purpose of breaking up the butter-globules, it is necessary that the bellows should be of sufficient length so as to obtain a long stroke of the bellows in inflating it with air and forcing it through the tubular dasher-shaft. Now without the partitions I at every downward and upward stroke of the dasher-shaft there would be a tendency of the flexible covering F to twist and tear itself from its fastenings, as there would be nothing to support the covering between the two heads G H, and for this reason the partitions are used, each partition having perforations for the passage of the air and a central opening for the dasher-shaft to pass. The bellows is held in position above the churn-body A by means of spring-arms K, which spring-arms at their upper ends are connected to the head H of the bellows. The arms K at their lower ends have inwardly-extending flanges $i$ to embrace the bottom of the churn-body, as shown in Fig. 1 of the drawings. These spring-arms are pressed against the churn-body and held securely thereto by means of a clamping-ring L, which ring is forced down in position, and when the arms are to be released to remove the churn-body A the clamping-ring is slipped up sufficient to remove the pressure thereof upon the spring-arms and release the arms from engagement with the churn-body. The arms K being of spring metal, the moment the clamping-ring is raised sufficiently to release the arms said arms will of themselves spring out from contact with the churn-body and allow said body to be removed.

A very important feature of the invention is the dasher-shaft when connected directly to the bellows, by which said bellows is operated by the vertically-reciprocating motion of the shaft without the necessity of any independent gearing or separate means of operating the bellows.

The peculiar construction of the bellows, consisting in its perforated partitions to serve as braces to the flexible covering, also the means of holding the bellows to the churn-body, consisting of the spring-arms and clamping-ring for compressing said arms, are all important features of the invention and materially enhance the value of the churn.

The dasher-shaft, when connected to the bellows as herein described, will allow of the shaft being adjusted to adapt itself to the depth of the cream in the churn-body.

Having now fully described my invention, what I claim as new, and desire to secure by Letters Patent, is—

The churn, the spring legs applied to its exterior, and having their upper ends extending above the top of the churn to form a support for the bellows, and a clamping ring L for securing the legs to the top of the churn, combined with the bellows mounted upon the top of the legs above the churn, the hollow dasher rod passing through the churn cover and the bellows, and provided with an opening through its side inside of the bellows; the set screw for securing the top of the bellows to the dasher rod, and the dasher, substantially as shown and described.

In testimony that I claim the above I have hereunto subscribed my name in the presence of two witnesses.

JOHN MARION STUKES.

Witnesses:
GEORGE KIDD,
FRANK. HENRY DAVIS.